United States Patent Office 3,384,626
Patented May 21, 1968

3,384,626
CROSS-LINKED POLYAMIDES
Robert M. Lusskin, Neenah, Wis., Frank Backer, Albany, N.Y., and John R. Larson, Upper Saddle River, N.J., assignors to Universal Oil Products Company, Des Plaines, Ill., a corporation of Delaware
No Drawing. Original application Sept. 26, 1963, Ser. No. 311,620. Divided and this application Feb. 13, 1967, Ser. No. 615,348
7 Claims. (Cl. 260—78)

ABSTRACT OF THE DISCLOSURE

The polymeric compositions of matter comprise the reaction product of a polyamide with a halo-substituted polyhydromethanonaphthalenedicarboxylic acid or anhydride thereof, said polymeric compositions of matter possessing desirable physical characteristics such as fire retardance and color stability. The resulting polyamide may be used for molding resins, films, coatings, insulation, etc.

---

This application is a division of our copending application Serial No. 311,620, filed September 26, 1963, now abandoned.

This invention relates to polymeric compositions of matter and particularly to polymeric compositions of matter containing, as one component thereof, a polyhalopolyhydromethanonaphthalenedicarboxylic acid or anhydride thereof.

The polymeric compositions of matter which are prepared according to the process of this invention in a manner hereinafter set forth in greater detail will possess many particular and desirable physical properties which make these particular compounds desirable and commercially attractive. For example, the polymers which may be prepared by treating a prepolymer with a polyhalopolyhydromethanonaphthalenedicarboxylic acid or anhydride thereof will possess fire retardant properties superior, in many instances, to other polymeric compositions of matter now in use. This property will be found to be of special advantages when preparing plastic materials to be utilized in places subject to excessive heat or possible flames, such uses including architectural panelling for construction work, ash trays, wall plugs for electrical connections, insulation, etc. where the aforementioned fire resistance is of primary concern. Furthermore, by utilizing a polyhalopolyhydromethanonaphthalenedicarboxylic acid or anhydride thereof as a constituent in the finished polymer, said product will be resistant to a large extent to discoloration as compared with polymeric products which have been prepared utilizing other chlorinated cyclic derivatives. The acid or anhydride due to its stability and resistance to deterioration will thus make it an attractive constituent of plastic materials or polymers which are colorless and should remain so or which are colored and will not darken, lighten or turn another color.

The color stability of products derived from polyhalopolyhydroalkanonaphthalenedicarboxylic acids and anhydrides thereof compared with similar compounds not containing the cyclohexane ring would not be expected based on current theoretical reasoning. Because alkylated cyclohexanes are known to undergo autoxidation readily, it might be predicted that polyhalopolyhydroalkanonaphthalenedicarboxylic acids and anhydrides thereof would be rapidly attacked by atmospheric oxygen and susceptible to free radical reactions catalyzed by light. Such attack should lead initially to hydroperoxide formation at the various ring junctions as well as at the positions alpha to the carboxyl groups. Decomposition of the hyproperoxides would lead to formation of alcohols, ketones, olefins, ring opening and further attack on the susceptible methylene carbon atoms. The products of these reactions which might be aromatic compounds, quinones and condensed materials would liberate hydrogen chloride and form highly colored products. The reason that these processes fail to occur with polyhalopolyhydroalkanonaphthalenedicarboxylic acids and anhydrides thereof has not been proven at this time. The term "prepolymer" as used hereinafter in the present specification and appended claims will refer to compositions of matter, comprising the reaction product of polymerizable monomers containing reactive functional substituents which will react with the polyhalopolyhydromethanonaphthalenedicarboxylic acid or anhydride thereof in a chemical manner to thus prepare the finished and desired composition of matter.

It is therefore an object of this invention to provide novel compositions of matter which possess desirable properties of flame retardancy and high color stability.

Another object of this invention is to provide novel compositions of matter by reacting certain prepolymeric compounds with a polyhalopolyhydromethanonaphthalenedicarboxylic acid or anhydride thereof to prepare compounds possessing valuable physical properties.

Taken in its broadest aspect, one embodiment of this invention resides in a composition of matter comprising the reaction product of a polymer containing at least one reactive functional group with a compound selected from the group consisting of polyhalopolyhydromethanonaphthalenedicarboxylic acids and anhydrides thereof.

A further embodiment of this invention is found in a composition of matter comprising the reaction product of a polymer containing at least one reactive functional group and 5,6,7,8,9,9 - hexachloro - 1,2,3,4,4a,5,8,8a-octahydro-5,8-methano-2,3-naphthalenedicarboxylic acid.

Other objects and embodiments will be found in the following further detailed description of this invention.

As hereinbefore set forth, it has been discovered that polyhalopolyhydromethanonaphthalenedicarboxylic acids or anhydrides thereof of the type hereinafter set forth in greater detail, may be reacted with prepolymeric compositions of matter to form finished polymers which will possess desired physical properties. Examples of prepolymers which will contain at least one reactive functional group, said reactive functional group being capable of reacting with a polyhalopolyhydromethanonaphthalenedicarboxylic acid or anhydride thereof to form the desired product, will include polymers generically referred to as polyamides and polyamines. The particular polyhalopolyhydromethanonaphthalenedicarboxylic acid or anhydride thereof will act to a certain extent as a curing agent or cross-linking agent and thus, enable the finished product to possess the desired physical characteristics and stability to possible deterioration, a particular example of this being a superior stability against discoloration due to deterioration of the particular polymeric product as compared to other products utilizing chlorinated compounds which add fire retardance to the finished product, but not color stability. By utilizing a polyhalopolyhydromethanonaphthalenedicarboxylic acid or anhydride thereof of the type hereinafter set forth in greater detail, the finished product as hereinbefore set forth, will possess a relatively high resistance to discoloration due to the structural configuration of the acid or anhydride which is used as the curing agent or cross-linking agent.

The polyhalopolyhydromethanonaphthalenedicarboxylic acid or anhydride thereof which comprises one ingredient of the finished product may be prepared in any suitable manner, one method being the two step process which comprises first effecting a Diels-Alder reaction of a conjugated aliphatic diene with an olefinic dicarboxylic acid. Examples of conjugated aliphatic dienes which may be used include 1,3-butadiene (hereinafter referred to as butadiene), 2 - methyl - 1,3 - butadiene (isoprene), 1,3-pentadiene (piperylene), 1,3-hexadiene, etc. Olefinic dicarboxylic acids which may be used include maleic acid, fumaric acid, itaconic acid, etc. It is contemplated within the scope of this invention that the term "olefinic dicarboxylic acids" may also include their intramolecular dehydration products such as, for example, maleic anhydride, etc. The Diels-Alder condensation between the conjugated aliphatic diene and the unsaturated dicarboxylic acid will take place at an elevated temperature in the range of from about 80° to about 250° C. or more and at a pressure sufficient to maintain a major portion of the reactants in a liquid phase, said pressure being in a range of from about atmospheric to about 100 atmospheres or more.

The tetrahydrophthalic acid, anhydride or homologue thereof which result from the aforementioned condensation is then further condensed with a conjugated halocycloalkadiene to form the desired product. Examples of halo-substituted cycloalkadienes which may be used include chloro-substituted 1,3-cyclopentadienes (hereinafter referred to as cyclopentadiene) such as tetrachlorocyclopentadiene, pentadichlorocyclopentadiene, hexachlorocyclopentadiene, etc. Other cycloalkadienes containing halogen substituents which may be used include pentabromocyclopentadiene, hexabromocyclopentadiene, etc. The second condensation reaction is also the Diels-Alder type and may be effected at elevated temperature in the range of from about 50° to about 250° C. and at atmospheric or superatmospheric pressures ranging up to about 100 atmospheres or more, the pressure being such as to maintain a major portion of the reactants in the liquid phase at the reaction temperature. If so desired both Diels-Alder condensations may be effected in the presence of an inert organic solvent, including aromatic solvents such as benzene, toluene, o-xylene, m-xylene, p-xylene, etc.; saturated paraffins and cycloparaffins such as pentane, hexene, heptane, cyclopentane, methylcyclopentane, etc.

Examples of polyhalopolyhydromethanonaphthalenedicarboxylic acids or anhydrides thereof which may be prepared include 5,6,7,8,9,9-hexachloro-1,2,3,4,4a,5,8,8a-octahydro - 5,8 - methano - 2,3 - naphthalenedicarboxylic acid, 5,6,7,8,9,9 - hexachloro - 1,2,3,4,4a,5,8,8a - octahydro - 5,8 - methano - 2,3 - naphthalenedicarboxylic anhydride, 5,6,7,8,9,9 - hexabromo - 1,2,3,4,4a,5,8,8a - octahydro - 5,8-methano-2,3-naphthalenedicarboxylic acid, 5,6,7,8,9,9-hexabromo - 1,2,3,4,4a,5,8,8a - octahydro - 5,8-methano-2,3-naphthalenedicarboxylic anhydride, etc.

As hereinbefore set forth, the aforementioned polyhalopolyhydromethanonaphthalenedicarboxylic acids or anhydrides thereof are reacted with certain polymeric compositions of matter containing at least one reactive functional group. An example of these polymeric products which may be reacted with the polyhalopolyhydromethanonaphthalenedicarboxylic acid or anhydride comprises polyamides. These polyamides may be prepared by condensing a polyamine with a dibasic acid. Examples of these polyamides would be the condensation of an amine containing more than two functional groups such as diethylenetriamine, dipropylenetriamine, etc., or with a molar excess of a diamine such as ethylenediamine, propylenediamine, etc., with a dibasic acid such as adipic acid, sebacic acid, etc. to form a prepolymer, said prepolymer containing a reactive functional amine group which may then be cross-linked with a polyhalopolyhydromethanonaphthalenedicarboxylic acid or anhydride thereof. This cross-linking may be done at temperatures ranging from about 200° up to about 300° C. or more. The resulting cured or cross-linked polyamide may then be used for molding resins, films, coatings, insulation, etc., the finished product again exhibiting the desired physical properties of being flame resistant and also being resistant to color changes due to the stability of the polyhalopolyhydromethanonaphthalenedicarboxylic acid or anhydride thereof which is utilized in the preparation as contrasted to other polyamine compounds which contain chlorinated cyclic derivatives.

The following example is given to illustrate the process of the present invention which, however, is not intended to limit the generally broad scope of the present invention in strict accordance therewith.

EXAMPLE

In this example, a prepolymer is prepared by condensing 103 g. (1.0 mole) of diethylenetriamine with 146 g. (1.0 mole) of adipic acid. The prepolymer is then cured by reacting said prepolymer with 425 g. (1.0 mole) of 5,6,7,8,9,9 - hexachloro - 1,2,3,4,4a,5,8,8a - octahydro - 5,8-methano - 2,3 - naphthalenedicarboxylic anhydride to form a polymer which, as in the case in the polymers formed in the above examples, possess an excellent color stability and flame retardancy as contrasted to other polymers of similar type which are prepared by using other chlorinated cyclic compounds which possess fire retardant, but not color stability, properties.

We claim as our invention:

1. A cross-linked polyamide consisting essentially of the reaction product formed, at a temperature in the range of from about 200° C. to about 300° C., of (A) a polyamide of a saturated aliphatic polyamine and a saturated aliphatic dicarboxylic acid with (B) a polyhalopolyhydromethanonaphthalenedicarboxylic acid or anhydride thereof.

2. The cross-linked polyamide of claim 1, further characterized in that reactant (B) is 5,6,7,8,9,9-hexachloro-1,2,3,4,4a,5,8,8a - octahydro - 5,8 - methano - 2,3 - naphthalenedicarboxylic acid.

3. The cross-linked polyamide of claim 1, further characterized in that reactant (B) is 5,6,7,8,9,9-hexachloro-1,2,3,4,4a,5,8,8a - octahydro - 5,8 - methano - 2,3-naphthalenedicarboxylic anhydride.

4. The cross-linked polyamide of claim 1, further characterized in that reactant (B) is 5,6,7,8,9,9-hexabromo-1,2,3,4,4a,5,8,8a - octahydro - 5,8 - methano - 2,3-naphthalenedicarboxylic acid.

5. The cross-linked polyamide of claim 1, further characterized in that said reactant (B) is 5,6,7,8,9a-hexabromo - 1,2,3,4,4a,5,8,8a - octahydro - 5,8 - methano-2,3-naphthalenedicarboxylic anhydride.

6. The cross-linked polyamide of claim 1, further characterized in that said polyamine is diethylenetriamine and said aliphatic dicarboxylic acid is adipic acid.

7. The cross-linked polyamide of claim 1, further characterized in that said polyamine is dipropylenetriamine and said aliphatic dicarboxylic acid is sebacic acid.

References Cited

UNITED STATES PATENTS

| | | | |
|---|---|---|---|
| 2,149,273 | 3/1939 | Carothers | 260—78 |
| 3,081,281 | 3/1963 | Beghin | 260—78 |
| 3,098,047 | 7/1963 | Tapas et al. | 260—22 |
| 3,196,191 | 7/1965 | Haigh et al. | 260—75 |
| 3,297,606 | 1/1967 | Dunkel | 260—78 |

WILLIAM H. SHORT, *Primary Examiner.*

H. D. ANDERSON, *Examiner.*